United States Patent [19]

Hamati et al.

[11] Patent Number: 4,486,693

[45] Date of Patent: Dec. 4, 1984

[54] MOTOR VELOCITY CONTROL

[75] Inventors: Sharbil Hamati, Garland; M. Alvin Heard, Richardson, both of Tex.

[73] Assignee: Contitronix, Inc., Garland, Tex.

[21] Appl. No.: 395,487

[22] Filed: Jul. 6, 1982

[51] Int. Cl.³ .............................................. G05B 13/00
[52] U.S. Cl. .................................... 318/561; 318/615; 318/616; 364/148
[58] Field of Search ............... 318/561, 341, 615, 616, 318/617, 618; 364/148

[56] References Cited

U.S. PATENT DOCUMENTS

| | | | |
|---|---|---|---|
| 4,054,820 | 10/1977 | Foster | 318/341 |
| 4,262,239 | 4/1981 | Kawa | 318/561 |
| 4,324,499 | 4/1982 | Giacone et al. | 318/341 X |
| 4,340,848 | 7/1982 | Hanagata et al. | 318/561 |
| 4,354,146 | 10/1982 | Tenmyo et al. | 318/341 |
| 4,355,273 | 10/1982 | Du Vall | 318/561 |
| 4,378,517 | 3/1983 | Morton et al. | 318/341 X |
| 4,386,397 | 5/1983 | Saeki | 318/561 |

Primary Examiner—B. Dobeck
Attorney, Agent, or Firm—Sigalos & Levine

[57] ABSTRACT

Apparatus for controlling the angular velocity of a motor shaft comprising a memory for storing digital data equivalent to a desired angular velocity curve for the motor shaft, means for determining the actual angular velocity of the shaft, means coupled to the memory and the means for determining the actual angular velocity of the shaft for comparing the actual angular velocity of the shaft with the desired angular velocity according to said curve and a computer coupled to the comparing means and the motor for adjusting the current to the motor whereby the velocity thereof is adjusted according to the comparison to cause said motor to have a velocity corresponding to said curve.

4 Claims, 4 Drawing Figures

MOTOR VELOCITY CONTROL

BACKGROUND OF THE PRESENT INVENTION

The present invention relates to motor velocity control in general and, in particular, to apparatus for controlling the velocity of a motor which drives a print font for a typewriter or printer. The print font could be of the type known as a daisy wheel or a thimble or any other type which may use petals. Hereinafter, the term "daisy wheel" will be used to represent all of these types. Typewriters or printers using daisy wheel print fonts must have motors driving the daisy wheels which can cause them to be positioned in at least any one of 96 positions, generally speaking, wherein each of those positions represents one of the petals of the daisy wheel on which a character font is located. Some daisy wheels have 100 petals, others have 88.

In commonly assigned co-pending patent application, Ser. No. 387,501, filed June 11, 1982 and entitled "Typewriter Daisy Wheel" an unusual daisy wheel is disclosed in which the petals are irregularly spaced about the circumference of the daisy wheel and have character heads of varying width to accommodate larger or smaller characters. Although 96 potential positions are provided on the daisy wheel and are equally spaced about the circumference thereof, only certain ones of those positions actually have a petal present and in some cases the centerlines of the petals are moved clockwise or counterclockwise from the normal equally spaced center line to accommodate an adjacent petal having a larger character associated with it. Because these petals are irregularly spaced and may be positioned clockwise or counterclockwise a quarter of a step from their normal positions, the motor driving the daisy wheel must have a capability of stepping the daisy wheel in one-quarter steps, or four times 96, which equals 384 positions about the circumference of the daisy wheel.

This means that the motor must know a reference position and be able to determine how far it has moved from that reference position in order to know how far to move to the next desired position.

Prior art circuits for controlling the velocity of the motor driving the print wheel or daisy wheel utilize an encoder coupled to the shaft of the motor which generates a reference signal representing a home position and one or more sine waves from which the rotational position of the shaft can be determined with respect to home position. Complex circuits are connected to receive the sine waves and utilize integrators and differentiators to constantly monitor the velocity of the motor shaft. When the motor shaft reaches a desired speed or velocity, the circuitry tends to have a feedback circuit which controls the velocity of the motor to maintain it at the desired velocity. Such control circuit, of course, does not take into account the acceleration or deceleration of the motor and operates simply to get the motor up to a desired velocity and maintains it there for a desired period of time and then decelerates it. This means that if the parameters of the motor change or if the motor temperature changes or other like factors change, the speed characteristics and torque characteristics of the motor also change so that it may accelerate faster or slower than normal. This means, then, that since the rotational velocity of the motor shaft is controlled only during the period of time of constant velocity of the motor shaft, that the time required to move from one location to the other varies with the characteristics of the motor, temperature, and the like. Further, the complex circuits for constantly monitoring the velocity and which use differentiators, integrators, operational amplifiers, and the like, make the system more costly and less reliable.

The present invention overcomes the disadvantages of the prior art by providing a motor control circuit which monitors the velocity of the motor shaft during three intervals, first, the accelerating interval, secondly, the constant velocity interval, and third, the decelerating interval. In each case, the monitoring is not continuous, but is based upon incremental movements of the motor shaft. Thus, by knowing the distance between angular position 1 and angular position 2 and knowing the time required for the shaft to move between those two positions, the velocity during that period of time can be calculated. By storing a series of digital data representing the three phases of travel of the motor shaft, that is, during acceleration, constant velocity, and deceleration, the desired velocity curve can be compared at appropriate points to the actual velocity of the shaft during comparable incremental time periods and the motor speed adjusted to maintain it at the desired velocity not only during the constant velocity cycle but also during the accelerating cycle and the decelerating cycle. By utilizing software to calculate the velocity during these time increments, a large number of components such as the differentiators and integrators and operational amplifiers are eliminated which makes the circuit much less expensive and makes it much more reliable and accurate since the motor velocity is caused to follow a desired curve during the acceleration and deceleration periods as well as during the constant velocity period.

SUMMARY OF THE INVENTION

Thus, the present invention relates to a method of controlling the angular velocity of a motor shaft comprising the steps of timing the movement of said shaft over a known distance from a first known point to a second known point, calculating the angular velocity of said shaft from said time and said distance, comparing said calculated velocity with a desired velocity and increasing the drive current to said motor if said calculated velocity is lower than said desired velocity and decreasing the drive current to said motor if said calculated velocity is greater than said desired velocity.

The invention also relates to apparatus for controlling the angular velocity of a motor shaft comprising a memory for storing digital data equivalent to a desired angular velocity curve for said motor shaft, means for determining the actual angular velocity of said shaft at predetermined rotational positions, comparing means coupled to said memory and said means for determining the actual angular velocity of said shaft for comparing the actual angular velocity of said shaft with said desired angular velocity and a computer coupled to said comparing means and said motor for adjusting the current to said motor whereby the velocity thereof is adjusted according to said comparison to approximate said desired angular velocity curve.

BRIEF DESCRIPTION OF THE DRAWINGS

These and other objects and advantages of the present invention will be disclosed in the course of the following specification, reference being had to the accompanying drawings, in which:

FIG. 1a illustrates a desired velocity curve for a daisy wheel motor illustrating the accelerate phase, the steady velocity phase, and the decelerate phase. FIG. 1b illustrates the current pulses which could be applied to the motor to cause it to accelerate according to the curve in FIG. 1a, reach the steady state velocity and then decelerate according to the curve shown in FIG. 1a;

DETAILED DESCRIPTION OF THE PREFERRED EMBODIMENT

Figure 1:
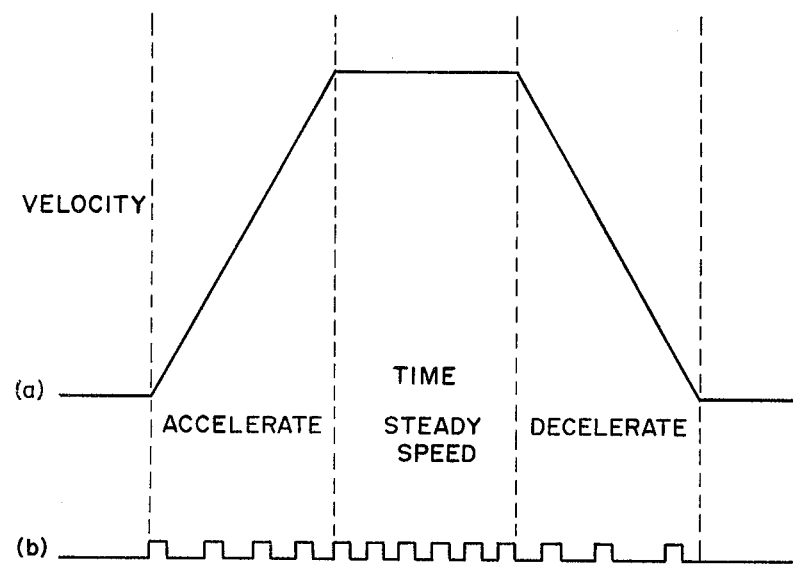

In providing velocity control for a motor driving a daisy wheel print font, it is required that the motor accelerate from zero velocity to a steady state velocity and then decelerate to a stop at the proper location. This means that the motor should ideally accelerate at some steady rate as shown in the curve in FIG. 1a to a desired steady state velocity and then maintain that velocity for a predetermined time or distance before the desired stopping location, at which time the motor must decelerate ideally at a constant rate to the point where it stops at the desired location. The reason such a curve is desired as shown in FIG. 1a is that with a constant acceleration, a steady state velocity and then a constant deceleration, the typing mechanism always operates at the same speed and types at the same rate and the power dissipation in the motor is minimized causing the motor to run cooler and be more reliable. In prior art motor control circuits, however, the velocity of the motor shaft is monitored only to make sure that it attains the desired steady state velocity. This means that during the accelerate portion of the curve shown in FIG. 1a, the curve may be either more or less steep depending upon the parameters affecting the motor such as torque, voltage, temperature, and the like. If for some reason the motor should accelerate faster than normal, it will arrive at the steady state desired value much faster. In like manner, if the deceleration is greater or less than the deceleration shown in FIG. 1a, the motor may arrive at the desired location faster or slower than normal. Thus the typing speed would vary between X and Y values of speed. Further, in the prior art, the circuit for monitoring the velocity of the motor shaft and to compare it with the desired steady state speed utilizes differentiators, integrators, operational amplifiers, and the like which add to the cost and complexity of the typewriter.

Figure 2:
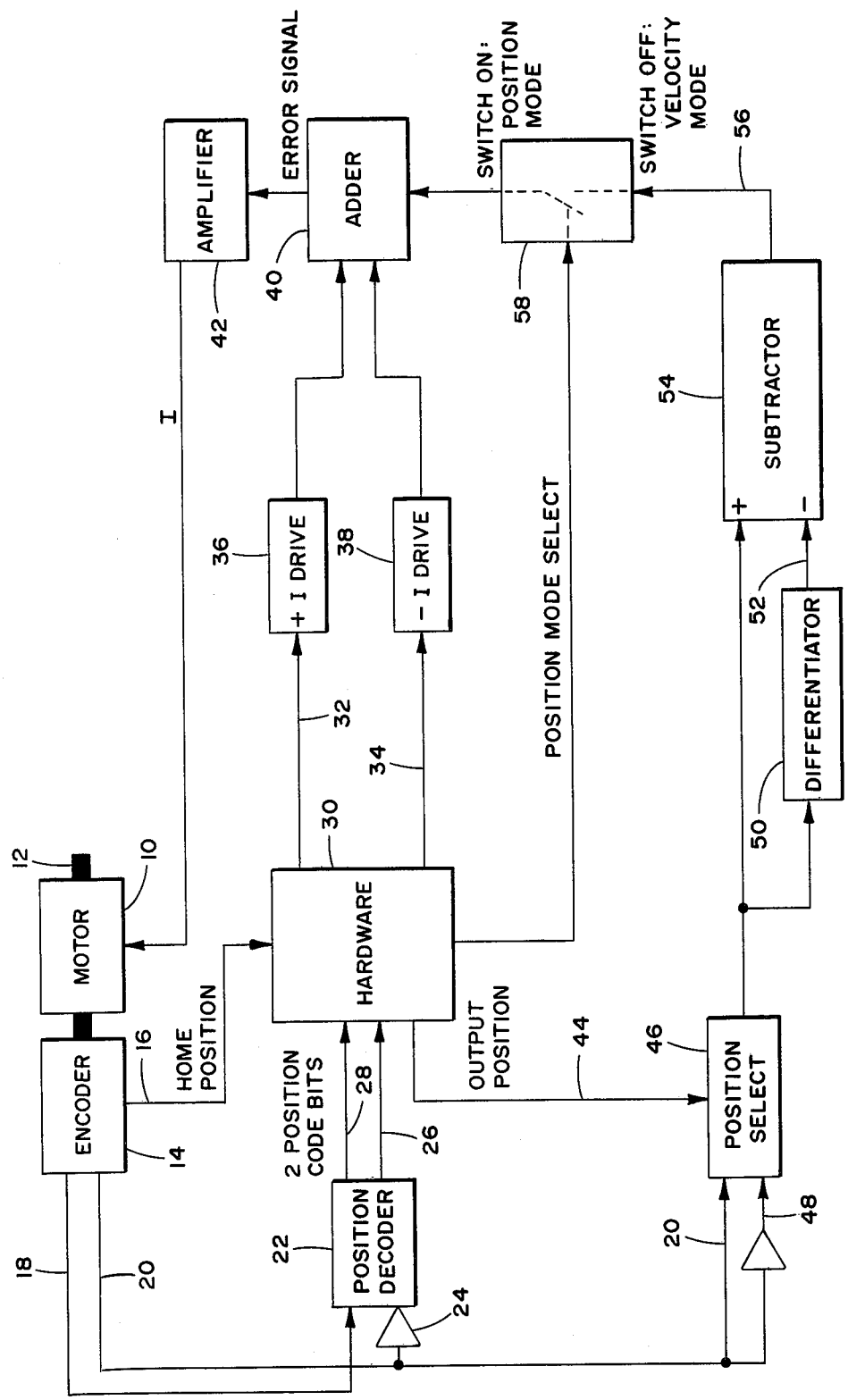
FIG. 2 illustrates a prior art motor velocity control circuit.

Such a control circuit for the prior art is illustrated in FIG. 2 wherein motor 10 drives shaft 12 on which is mounted the print font such as a daisy wheel or thimble. An encoder 14 is attached to the shaft motor 10 and produces an output on line 16 which represents the home position of the motor shaft so that the circuit can determine how far the motor shaft has moved from a particular location at any particular time. Also, the encoder 14 produces sine waves on lines 18 and 20 by well known means such as an optical encoder and which sine waves are utilized to determine the position location of the shaft of motor 10. A position decoder 22 receives the sine wave on line 18 and also receives a sine wave on line 20 that is displaced 90° from the sine wave on line 18. The position decoder 22 functions in a well known manner as shown in FIG. 3 to produce a pair of code bits on lines 26 and 28 representing the position of the motor shaft of motor 10.

Figure 3:
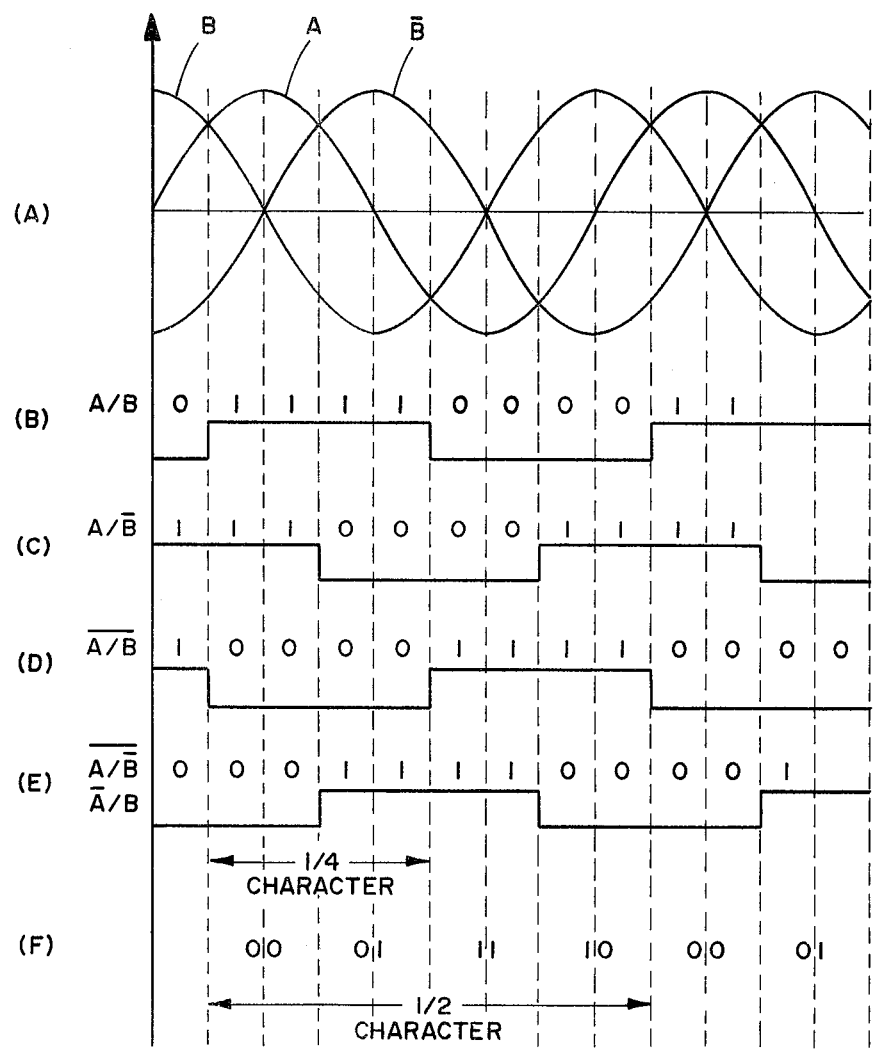
FIG. 3 illustrates the sine waves produced by the encoder attached to the motor shaft and the corresponding digital signals produced from said sine waves which can indicate the rotational position of the motor shaft.

FIG. 3 discloses the manner in which this is accomplished.

FIG. 3a represents the sine waves on lines 18 and 20. Thus, sine wave A represents the signal on line 18 of FIG. 2, while sine wave B represents the signal on line 20 of FIG. 2.

FIG. 3b illustrates the digital voltage levels produced by comparing sine waves A and B. Whenever sine wave A is greater than Sine wave B, a voltage is produced which represents a "1" as shown in FIG. 3B. Whenever sine wave A is smaller than sine wave B, the position decoder 22 produces a signal which represents a zero as shown in FIG. 3b. Position decoder 22 also compares sine wave A with the inversion of sine wave B and when sine wave A is larger, a zero is developed as shown in FIG. 3c while when sine wave A is smaller, a signal representing a "1" is generated as shown in FIG. 3C. FIG. 3d and e are simply inversions of the waves shown in FIG. 3b and c, respectively. Thus, by looking at both FIG. 3d and 3e, the digital code in FIG. 3f is obtained. The encoder 14 is so designed that it produces 192 complete sine waves for each revolution of the motor shaft. One complete sine wave represents movement through one-half of a character position as shown in FIG. 3f.

Thus, position decoder 22 produces the bits shown in FIG. 3f on lines 26 and 28 which are coupled to hardware circuit 30 which adjusts its output on line 32 and 34 to vary the plus and minus current drive units 36 and 38, respectively, to vary the current through adder 40, and amplifier 42 to motor 10, thus attempting to maintain the velocity of motor 10 at a desired constant velocity. Hardware unit 30 has well known circuits including integraters, differentiators, operational amplifiers, and the like, which differentiate the signals received to obtain velocity signals. These velocity signals are compared with the desired velocity to produce the output signals on lines 32 and 34. When the hardware calculates the position at which the motor is to stop, as the sine waves enter into the last cycle nearest the stopping point, the hardware generates a signal on output line 44 which is coupled to position select circuit 46 which actually selects the sine wave on line 20 or the inverted sine wave on line 48, and picks the nearest zero crossing going positive as shown in FIG. 3a, and that sine wave is differentiated by unit 50 which produces an output on line 52 that is coupled to a subtractor 54 and the output of subtractor 54 on line 56 is coupled through a switch 58 to adder 40. That signal is used to subtract from the current driving motor 10 through amplifier 42 and thus brings the motor to a stop at the desired location.

Figure 4:
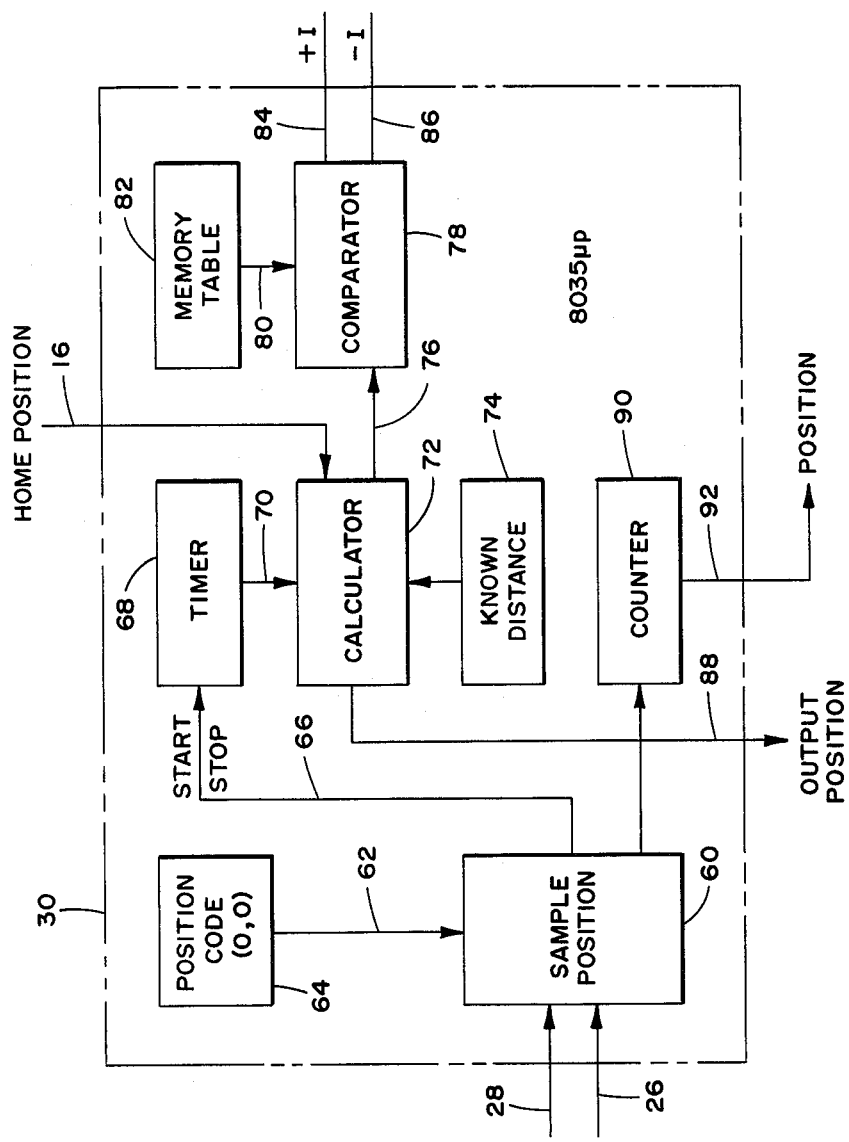
FIG. 4 is a block diagram illustrating the motor control circuit of the present invention.

Applicant's novel motor control circuit is shown in FIG. 4 wherein the unit designated 30 replaces the hardware unit 30 shown in FIG. 2. In this case, the code bits on lines 26 and 28 from position encoder 22 are coupled to a sample position unit 60 which also has as an input on line 62 a code from position code unit 64. That code selected by position code unit 64 is equivalent to the code illustrated in FIG. 3f. Suppose, for instance, the code position generated on line 62 was selected as 00. When that position is reached by motor 10, the encoder 14 produces sine waves which cause position decoder 22 to produce a 00 on lines 26 and 28, respectively. The sample position unit 60 produces an output at that time on line 66, which starts timer unit 68. When the next code position 00 is reached by the motor shaft turning, and 00 again appears on lines 26 and 28, sample position unit 60 produces another pulse on line 66 which stops timer 68 and thus timer 68 produces on line 70 a value of time, T, which is coupled to calculator 72. Since the calculator stores the known distance 74 from 00 in FIG. 3f to the next 00 position, and since it also knows the time on line 70 for the shaft to go that distance, the actual velocity of the shaft can be calculated and produced on line 76 by calculator 72. This velocity is coupled to a comparator 78 which also receives an encoded signal on line 80 from memory table 82 which represents the digital equivalent of the desired acceleration or velocity curve at the desired point as shown in FIG. 1a. Thus, by comparing the desired velocity curve at a known time with the actual velocity of the motor shaft at that time the comparator can produce control signals on lines 84 and 86 which cause the motor to accelerate or decelerate to the proper velocity.

The calculator 72, of course, can receive the home position signal on line 16 and knowing how far the shaft has turned, and knowing where it is desired that the shaft stop, the calculator can produce an output on line 88 representing a desired zero crossing of the sine wave shown in FIG. 3, which initiates the slow down procedure of the motor as described earlier in relation to FIG. 2. Further, the counter 90 would know how many sine waves have been received and, knowing how far the shaft has to travel, could initiate the position mode on line 92 which would close switch 58 in FIG. 2 and allow the position select circuit 46 to bring the motor to a stop.

Thus, it can be seen that the present invention determines shaft velocity only during a particular interval. For instance, as shown in FIG. 3f, if the selected interval is from 00 to 11, then the motor velocity would be calculated every one-fourth of a character. This means that the circuitry would rest for one-quarter of a character, would calculate velocity for one-quarter of a character, and would repeat that process. If the selected distance interval is from 00 to 00, the calculations will take place constantly. Thus it can be seen that the length of time during which the calculation of velocity takes place depends upon the code selected and can be intermittent or continuous.

Thus there has been disclosed a novel motor velocity control circuit for driving a daisy wheel print font in which the acceleration and deceleration of the motor is monitored as well as the steady state velocity and the circuit is controlled during acceleration, during steady state and during motor deceleration, so that the motor follows an ideal curve as shown in FIG. 1a and the typewriter or printer always types the same speed regardless of the changes in the parameters of the motor which tend to change motor velocity.

While the invention has been described in connection with a preferred embodiment, it is not intended to limit the scope of the invention to the particular form set forth but, on the contrary, it is intended to cover such alternatives, modifications, and equivalents as may be included in the spirit and scope of the invention as defined by the appended claims.

I claim:
1. A method of controlling the angular velocity of a motor shaft comprising the steps of:
   (a) timing the movement of said shaft during acceleration, steady state velocity and deceleration over a known distance from a first known point to a second known point,
   (b) calculating the angular velocity of said shaft from said time and said distance,
   (c) comparing said calculated velocity with a desired velocity at known time intervals, and
   (d) increasing the drive current to said motor if said calculated velocity is lower than said desired velocity and decreasing the drive current to said motor if said calculated velocity is greater than said desired velocity.

2. A method as in claim 1 further comprising the step of generating digital signals representing said first and second known points bounding said known distance.

3. Apparatus for controlling the velocity and position of a motor drive shaft comprising:
   (a) a motor with a rotatable shaft,
   (b) means coupled to said motor for generating signals representing a home position of said shaft and angular rotational positions of said shaft in increments of 1/384 of an entire revolution,
   (c) a computer coupled to said generating means for calculating position and actual angular velocity of said shaft based upon said home position signal and the time for said shaft to travel between first and second pre-determined ones of said rotational positions,
   (d) a memory in said computer for storing digital data representing a desired angular velocity of said shaft over acceleration, steady state velocity and deceleration intervals, and
   (e) comparing means coupled to said memory and said computer for comparing said desired velocity with said actual velocity and producing an output signal which causes said motor to seek said desired velocity.

4. Apparatus as in claim 3, wherein said means for determining said actual angular velocity comprises:
   (a) means for generating digital signals representing at least first and second pre-determined angular positions of said shaft separated by a known distance, D,
   (b) means for determining said time, T, for movement of said shaft over said distance, D, and
   (c) a computer coupled to said generating means and said timing means for calculating the actual angular velocity, of said shaft according to the equation $=D/T$.

* * * * *